Figure 1:
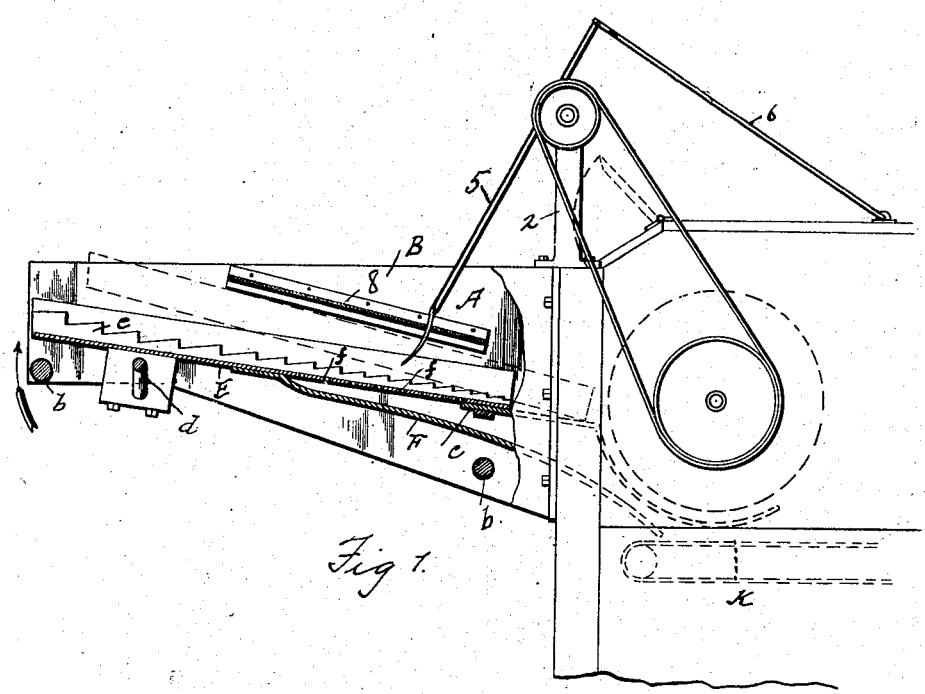

No. 693,180. Patented Feb. 11, 1902.
S. SOUTHWORTH.
THRESHING MACHINE.
(Application filed Dec. 22, 1900.)
(No Model.)

WITNESSES
Nat Massey
May E. Kott.

INVENTOR
Sidney Southworth
by Parker & Burton
Attorneys.

THE NORRIS PETERS CO., PHOTO-LITHO., WASHINGTON, D. C.

UNITED STATES PATENT OFFICE.

SIDNEY SOUTHWORTH, OF CHARLOTTE, MICHIGAN.

THRESHING-MACHINE.

SPECIFICATION forming part of Letters Patent No. 693,180, dated February 11, 1902.

Application filed December 22, 1900. Serial No. 40,723. (No model.)

*To all whom it may concern:*

Be it known that I, SIDNEY SOUTHWORTH, a citizen of the United States, residing at Charlotte, county of Eaton, State of Michigan, have invented a certain new and useful Improvement in Threshing-Machines; and I declare the following to be a full, clear, and exact description of the invention, such as will enable others skilled in the art to which it pertains to make and use the same, reference being had to the accompanying drawings, which form a part of this specification.

This invention relates to threshing-machines, and has for its object an improved feeder for threshers which is especially useful in feeding that class of material that is not bound into bundles at the time it is harvested.

The machine in which this invention is embodied is especially useful in feeding beans and bean-straw, unbound buckwheat, and clover-straw that is subjected to a threshing process to separate the seeds from the straw.

One special feature of the improvements is found in the device which is used to separate loose seeds, and especially loose beans, from the straw before the same goes through between the cylinder and the concave.

Where bean-straw in which there is a large quantity of loose or shelled beans passes into the machine between the cylinder and the concave, the teeth of the cylinder strike directly against the shelled bean and breaks or splits it, and the broken or split beans are refuse beans, not salable at a full price, and there is considerable loss from this source under the ordinary treatment. This improvement is intended to separate largely such loose and shelled beans from the straw and deliver them under the concave onto the carrier without leading them through between the concave and cylinder of the threshing-machine.

Another feature of improvement contained in the machine is found in the automatic feeding, which enables the attachment to take the place of the laborer who has generally been required to stand at the mouth of the threshing-machine and feed material into it. The position at the mouth of the machine is one that requires very hard work, and it is very dirty and disagreeable work, and because of the dirt and dust it frequently happens that the workman cannot or will not feed the machine to its full capacity, whereas with the improved device not only is the thresher fed to its full capacity, but it is shaken up and loosened, so that the loose and shelled beans or other similar seeds drop to the bottom of the feeder and are separated out from the straw and carried by the thresher, while the attendants are enabled to stand in a place of comparative comfort at a distance from the dust and dirt that is raised by the action of the machine and its work.

Figure 2:
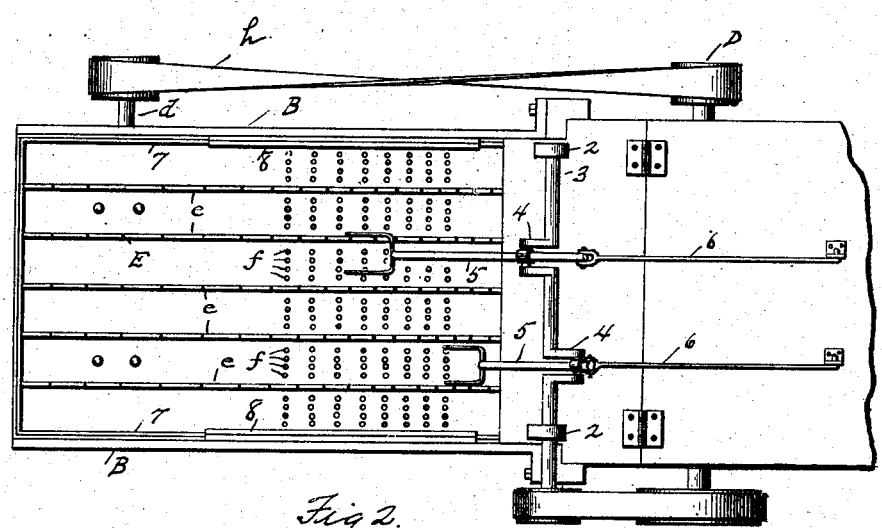

In the drawings, Figure 1 is a side elevation, mainly in section, of the feeding attachment connected to the mouth of the threshing-machine, and this view indicates the position of the cylinder, the concave, and the carrier under the concave. Fig. 2 is a plan view of the feeding attachment.

The attachment consists of a frame A, that is made fast to the mouth of the machine and extends back from the feed-board for a considerable distance. The sides of the frame consist of vertical side boards B B, held by cross-bars $b\ b$ and secured by bolts or in any suitable way to the end of the threshing-machine. Between the side parts is a bottom $a$, that rests at one end on the feed-board C and at the other end on the crank of a cross-shaft $d$. The shaft $d$ is journaled in bearings in the side boards B, and on one end of the shaft is a pulley belted by a belt $h$ to a pulley D on the end of the cylinder-shaft. The bottom E is divided lengthwise by serrated strips $e$, each of which is provided with serrations that are large at the outer or rear end and gradually diminish in size toward the cylinder end. The bottom E is perforated with numerous perforations $f$, and below the perforated part is a second bottom F, that reaches below the feed-board and under the concave and is arranged to deliver any material falling on it to the carrier K.

Above the mouth of the thresher, supported on posts 2, is a shaft 3, having a number of cranks 4, and at each crank there is mounted a fork 5, the top end of which is connected by a link 6 to the casing of the thresher. The bottom of the fork swings when the crank is rotated, and if the proper rotation be given to the crank the bottom of tine end of the fork reaches down toward the feed-board and pushes back and up a part of the straw that may be on its way to the threshing-machine.

At each side of the bottom board E are side boards 7, made fast to the bottom board, these side boards being, preferably, of sheet metal and consequently thin, and they work closely in contact with the side boards B of the casing.

On the casing B, at each side, is a guard 6, preferably of some flexible material or leather arranged to hang slightly away from the side board and to engage over the thin sides 7, rising from the bottom board.

The outermost end of the bottom board A has a substantially circular motion as the crank-shaft d rotates, and the innermost end has a reciprocating motion, sliding back and forth on the end of the feed-board.

In action the straw to be threshed is thrown loosely onto the movable bottom, which is put into action at the same time with the threshing-machine, and is gradually fed forward into the machine by the thrusts of the teeth or serrations on the ribs e. At the same time the forks, which are put in motion by the shaft 3, whose pulley is belted to the shaft of the cylinder, strikes into and lifts up and pushes back some part of the straw. The forks serve to loosen and lighten up the straw and allow shelled seeds to shake down through it to the bottom board. The forward action or feed action of the straw is aided by the thrusting action of the movable bottom board, which has its greatest inclination during the time of its forward stroke, and drop away from under the straw at the time of its back stroke.

What I claim is—

In a feeding device for threshing-machines, the combination of a movable feed-board, provided with apertures and with strips extending lengthwise the feed-board said strips being serrated with teeth that are large at the outer end and which gradually diminish in size toward the cylinder end, a seed-conductor located below and secured to the apertured feed-board and arranged to deliver seed under the concave of the threshing-machine, and reciprocating forks arranged to reach toward the feed-board and to push back and upward a part of the straw, thereby loosening the straw and allowing loose seeds to drop through the straw to and through the feed-board onto the conductor, substantially as described.

In testimony whereof I sign this specification in the presence of two witnesses.

SIDNEY SOUTHWORTH.

Witnesses:
D. B. DAVIDSON,
ESTELLE KLAISS.